May 19, 1925.
A. C. LARSEN
VEHICLE WORK RACK
Filed Jan. 23, 1924
1,538,437
2 Sheets-Sheet 1
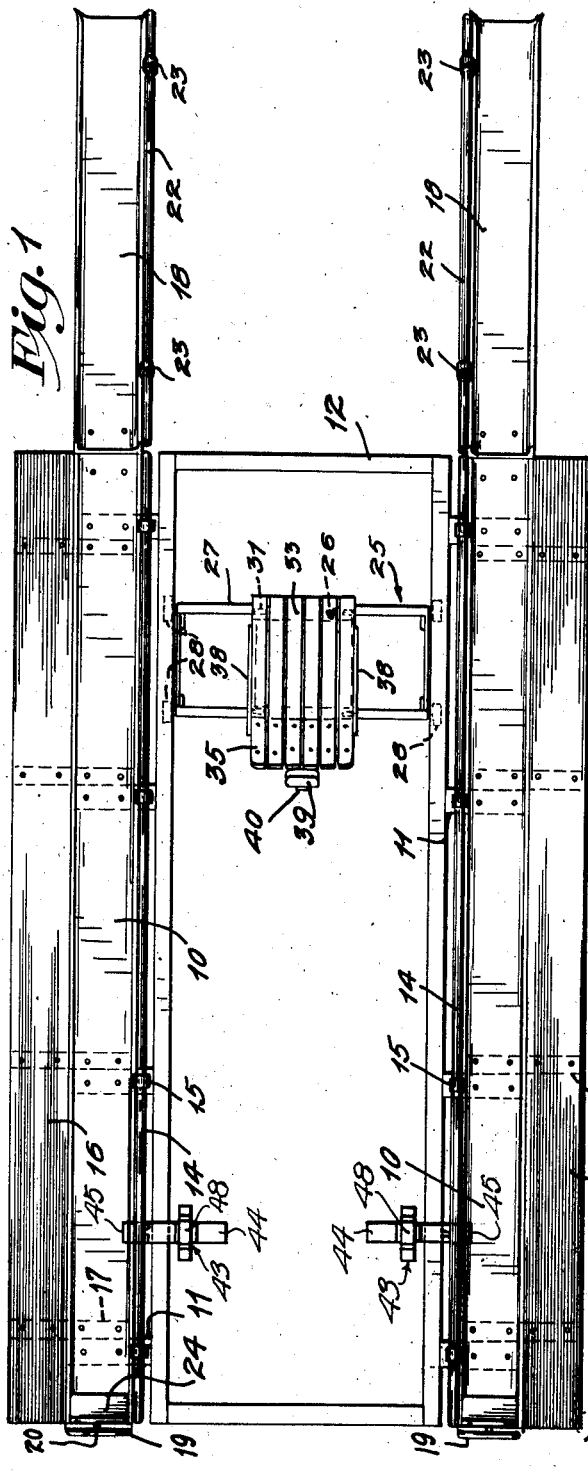
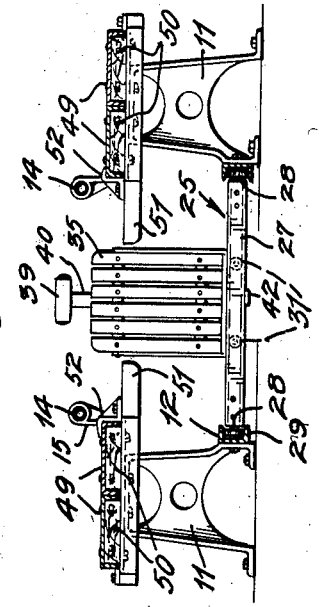
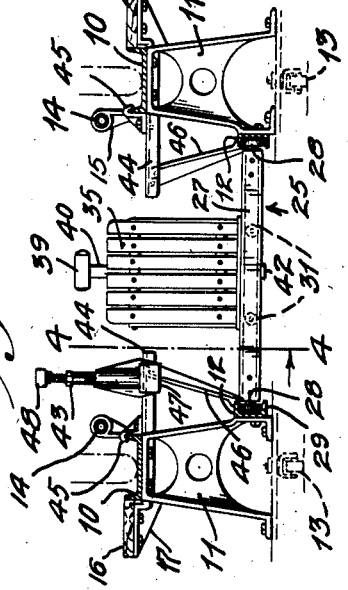
Inventor
Andrew C. Larsen
By his Attorneys
Merchant and Kilgore

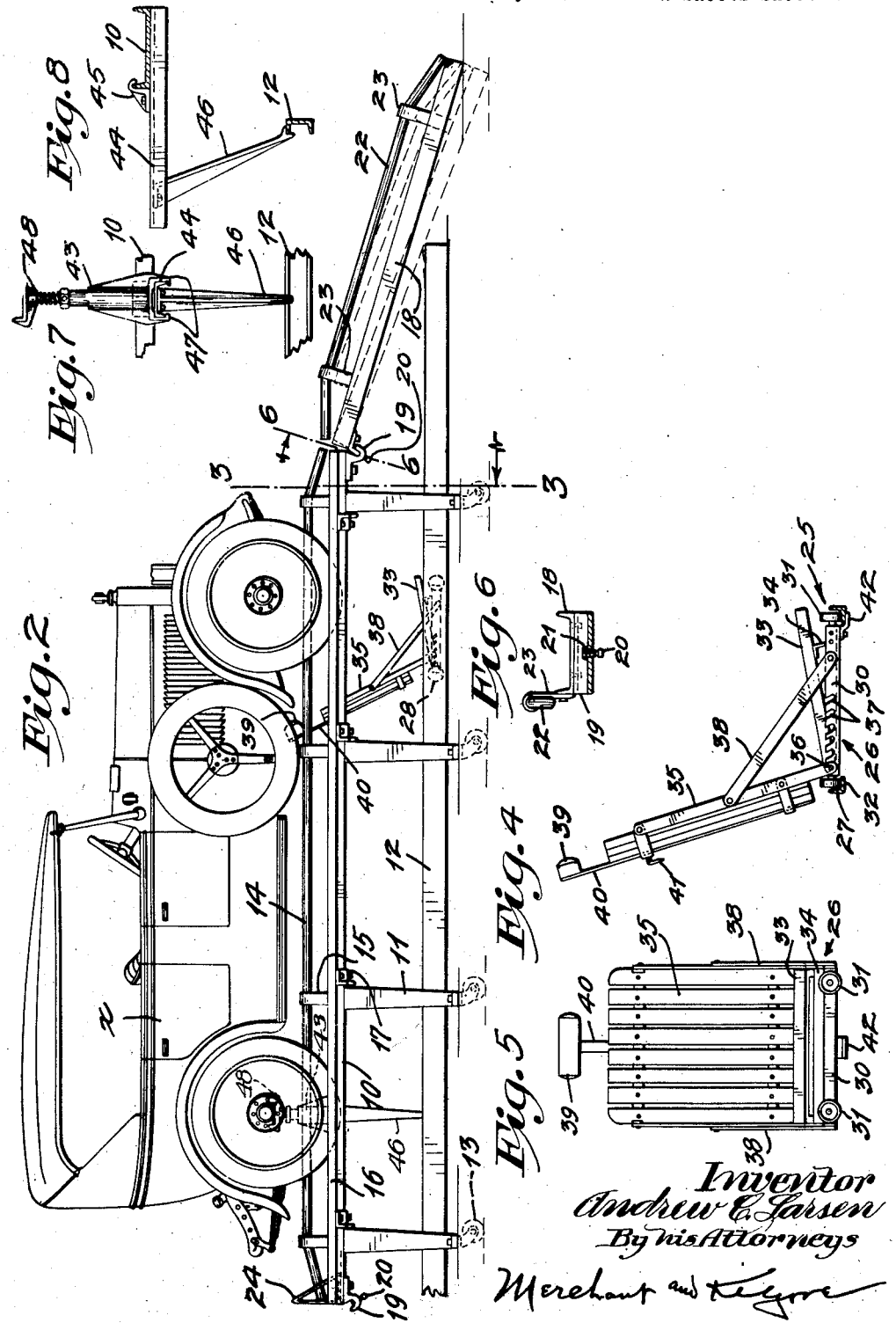

Patented May 19, 1925.

1,538,437

UNITED STATES PATENT OFFICE.

ANDREW C. LARSEN, OF MINNEAPOLIS, MINNESOTA.

VEHICLE WORK RACK.

Application filed January 23, 1924. Serial No. 687,962.

*To all whom it may concern:*

Be it known that I, ANDREW C. LARSEN, a citizen of the United States, residing at Minneapolis, in the county of Hennepin and State of Minnesota, have invented certain new and useful Improvements in Vehicle Work Racks; and I do hereby declare the following to be a full, clear, and exact description of the invention, such as will enable others skilled in the art to which it appertains to make and use the same.

My invention has for its object to provide an extremely simple and highly efficient work rack for vehicles, especially for automobiles and trucks, while repairing, oiling, greasing, washing or painting the same.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the invention with some parts removed;

Fig. 2 is a side elevation of the same with an automobile supported thereon;

Fig. 3 is a view partly in end elevation and partly in transverse vertical section taken on the line 3—3 of Fig. 2;

Fig. 4 is a side view of the carriage with some parts sectioned on the line 4—4 of Fig. 3, on an enlarged scale;

Fig. 5 is a front view of the carriage with some parts removed;

Fig. 6 is a detail view with some parts sectioned on the line 6—6 of Fig. 2;

Fig. 7 is a view of the jack and jack support with parts of the work rack to which said support is attached;

Fig. 8 is a side view of the parts shown in Fig. 7 with the exception that the jack is removed; and Fig. 9 is a view corresponding to Fig. 3 but showing a modification in which the track rails are designed for a truck or other vehicle having wide wheels.

Referring first to the invention as shown in Figs. 1 to 8, inclusive, the numeral 10 indicates a pair of channel track rails, each of which is supported in an elevated position on a plurality of longitudinally spaced leg brackets 11. The distance between the centers of the track rails 10 is substantially the same as that of standard vehicles. All of the leg brackets are rigidly connected by a rectangular frame 12 formed from a commercial channel bar, the flanges of which are turned horizontally inward, and the longitudinal members of said frame are of substantially the same length as the track rails 10 and are rigidly secured to the inner sides of said leg brackets, just above the floor.

The leg brackets 11 may be bolted to the floor, as shown by full lines, or they may be equipped with heavy casters 13, as shown by broken lines, thus making the work rack portable so that it may be easily moved from place to place. Guard rails 14 are extended along the inner longitudinal edges of the track rails 10 and supported on short posts 15 rigidly secured to the inner flanges of said track rails. Outward of each track rail 10 is a longitudinal running board 16 supported on and rigidly secured to outstanding horizontal arms or brackets 17 rigidly secured to the under sides of the track rails 10.

To permit an automobile X or other vehicle to be run onto or off from the track rails 10, under its own motive power, there is provided a runway in the form of a pair of inclined channel track rails 18 of the same width as the track rails 10. The inner ends of the inclined track rails 18 are detachably supported from the track rails 10, at either end thereof, by separable hinges 19. The hinge members on the inclined track rails 18 have downturned transverse retaining flanges which loosely rest in transverse grooves in the members of the hinges secured to both ends of the track rails 10. To keep the inclined track rails 18 aligned with the track rails 10, stops 20 in the form of screws have threaded engagement with the members of the hinges 19 on the track rails 10, extend into the transverse grooves therein, and into intermediate notches 21 in the retaining flanges of the members of the hinges 19 on the inclined track rails 18, as best shown in Fig. 6.

Guard rails 22, for the inclined track rails 18, are aligned with the guard rails 14, and are supported on short posts 23 rigidly secured to the inner flanges of said inclined track rails. These guard rails 14 and 22 are provided to prevent a vehicle from running off the track rails 10 and 18 at either side thereof. The ends of the guard rails 14 and 22 are bent downward into close engagement with the underlying flanges on the track rails 10 and 18 to eliminate all blunt or abrupt surfaces. Stops 24 are provided to prevent the automobile X from running off from the opposite ends of the track rails 10 from the inclined track rails 18. These stops 24 are supported on the webs of the track rails 10 and are detachably secured thereto, by bolts or otherwise, so that the same may be applied to either end of said track rails, depending upon the end from which the inclined track rails are supported.

A carriage 25 is mounted to travel longitudinally under and between the track rails 10 and is provided with a body mounted thereon to travel tranversely of said track rails, and which body affords a creeper 26 for a mechanic while inspecting or working on a vehicle supported on the track rails 10. Said carriage 25 includes a rectangular frame 27 on which truck wheels 28 are journaled and arranged to travel in the channel side members of the frame 12 which afford track rails 29 therefor. This carriage frame 27 is formed from an angle bar, one flange of which is upright, and the other flange of which extends horizontally inward. The end members of the rectangular frame 12 afford stops for limiting the travelling movement of the carriage 25 on the track rails 29.

The creeper 26 includes a rectangular frame 30 on which truck wheels 31 are journaled and arranged to run on the horizontal flanges of the carriage frame 27 which afford track rails 32 therefor. The vertical flanges of the track rails 32 afford guides for the truck wheels 31.

The creeper 26 is provided with a seat 33 hinged to the frame 30 of said creeper for movement longitudinally of the work rack and is provided at its free end with a transverse angle bar 34 which rests on the side members of said frame and supports said seat slightly inclined, as best shown in Fig. 4. The seat 33 is provided with an adjustable back 35 secured to the creeper frame 30 by hinge pins 36 arranged to be mounted in longitudinally spaced lock notches 37 in the vertical flanges of said creeper frame 30. Side arms 38 are pivotally connected to the creeper frame 30 and side members of the back 35 and hold said back against movement on its hinge pins 36. Obviously, by adjusting the hinge pins 36 in the different lock notches, the back 35 may be set in different inclined positions.

The back 35 is provided with a head rest 39 secured to the upper end of a support 40 mounted for vertical adjustment in seats in the upper and lower horizontal members of the back 35 and secured thereto in different adjustments by a hand piece-equipped set screw 41 having threaded engagement with said upper horizontal member and arranged to impinge against said support. To prevent the creeper 26 from tipping backward, there is secured to the front end of the frame 30 a retaining lip 42 arranged to extend under the adjacent track rail 32, as best shown in Fig. 4.

To prevent the automobile X from rolling on the track rails 10 and also for lifting either end thereof so that either one or both of the front or rear wheels may be raised from said track rails, I provide one or more lifting jacks 43 and a detachable and longitudinally shiftable support 44 for each therefor. These jack supports 44 extend transversely under the track rails 10, project inward therefrom, and are detachably secured thereto by grapple hooks 45 arranged to interlock with the inner flanges of said track rails with freedom for longitudinal adjustment thereon. As shown, each jack support 44 is in the form of a channel bar, the flanges of which extend downward and to the web of which is secured the grapple hook 45. Each jack support 44 is further supported by an oblique depending leg 46 having a fork-like lower end arranged to engage the underlying side bar of the frame 12. The jacks 43 are provided with bases, mounted to slide longitudinally upon the jack supports 44, which have depending side flanges with inturned ends arranged to interlock with the flanges 47 of said jack support and guide the jacks thereon and prevent either transverse or lifting movements therefrom. Said jacks 43 are provided at their upper ends with U-shaped heads 48 adapted to receive either the rear axle structure or the front axle. Obviously, when the head 48 of the jack is interlocked with either the rear axle housing or the front axle, the automobile X cannot roll on the track rails 10.

Referring now to the invention as illustrated in Fig. 9, the structure is the same as that just described with the exception that it is especially designed for trucks or other vehicles having wide wheels or tires. In this structure the track rails 49 are each formed by placing a pair of inverted channel bars side by side and securing the same to the leg brackets 11. These track rails will be further strengthened by placing therein fillets 50 of wood, and which track rails will support, like the track rails 10, wide inclined track rails, not shown. Secured to the track rails 49 are transverse inwardly projecting detachable and longitudinally shiftable supports 51 having grapples 52 arranged to engage the inner longitudinal edges of said track rails to assist in holding said supports, and on which supports may be placed planks, not shown, on which a mechanic may lie, if necessary, when working on an automobile, and for supporting tools and parts for the automobile.

From the above description it is evident that an automobile, truck or other vehicle may be easily positioned on the track rails, under its own power, by running the same forward or backing up on the inclined runways. While inspecting or working on a vehicle, a mechanic resting on the seat 33 may very easily and quickly move into different longitudinal positions under the vehicle by causing the carriage 25 to move on the track rails 29, or into different transverse positions under the vehicle by causing the creeper 26 to move on the track rails 32 of the carriage 25. By making the inclined track rails independent the one from the other and supporting their outer or free ends directly on the floor or ground, the same are firmly supported even when resting on an uneven floor or other surface. When not in use, the back 35 may be folded under the seat 33 by releasing its hinge pins 36 from the lock notches 37.

The height of the track rails is such that a vehicle supported thereon is at a sufficient height to permit a mechanic to sit upright on the seat 33 so that he may work with ease in a natural position and at the same time move longitudinally of the vehicle or from side to side thereof as previously described.

As is well known, the greater part of work done underneath an automobile, may be done while one end thereof is elevated. Various different devices have been used for this purpose but are more or less cumbersome and in the way of the handler. By the use of my improved work rack, one pair of wheels of an automobile may be run upon the inclined track rails 18 and positioned on the upper track rails 10, while the other pair of wheels rest on the floor. It will be noted that the length of the frame 12 is such as to extend under the inclined track rails 18 and thereby permit the carriage to be moved on the lower track rails 29 and be positioned between the inclined track rails 18 so that a mechanic may work on an automobile positioned as above noted.

The supports 44 and 51 do not interfere in any way whatsoever with the longitudinal travelling movement of the creeper and when said creeper is moved transversely the same may be positioned so that its back will be either in front or back of the supports 44, or said back may be lowered so as to move under the planks (not shown) on the supports 51. It is, of course, understood that the supports 44 and 51 may be very quickly removed when not in use or shifted in different longitudinal adjustments in case they interfere with the mechanic or the transverse movement of the creeper.

What I claim is:

1. A rack of the kind described comprising a pair of laterally spaced supports, and a carriage having a body-supporting member mounted to travel longitudinally and transversely between and below the same.

2. A rack of the kind described comprising a pair of laterally spaced supports, and a carriage mounted to travel longitudinally between and below the same, said carriage having a body mounted to travel transversely thereon.

3. A rack of the kind described comprising a pair of track rails, and a carriage mounted to travel longitudinally between the track rails and having a body mounted to travel transversely thereon.

4. A rack of the kind described comprising upper and lower pairs of track rails, and a carriage mounted to travel on the lower track rails and having a body mounted to travel transversely thereon.

5. A rack of the kind described comprising upper and lower pairs of track rails, runways leading to the upper track rails, and a carriage mounted to travel on the lower track rails and having a body mounted to travel transversely thereon.

6. A rack of the kind described comprising a pair of upper track rails and a pair of lower track rails, and a carriage arranged to travel on the lower track rails and having a body mounted to travel transversely thereon.

7. A rack of the kind described comprising a pair of upper track rails and a pair of laterally spaced channel bars, the flanges of which are turned toward each other and which channel bars afford a pair of lower track rails, and a carriage having wheels arranged to run on the lower track rails and also having a body mounted to travel transversely thereon.

8. A rack of the kind described comprising a pair of laterally spaced channel bars, the flanges of which extend upward and which channel bars afford a pair of upper track rails, a second pair of channel bars affording a pair of lower track rails and the flanges of which are turned toward each other, and a carriage having wheels arranged to run on the lower track rails.

9. A rack of the kind described comprising a pair of upper track rails, longitudinally spaced supports for each track rail, a rectangular frame connecting said supports and having channel side bars affording a pair of lower track rails and the flanges of which are turned toward each other, and a carriage having wheels arranged to run on the lower track rails.

10. A rack of the kind described comprising a pair of laterally spaced supports, guard rails extending longitudinally of said supports, and a carriage mounted to travel longitudinally between and below said supports.

11. A rack of the kind described comprising a pair of elevated track rails, running boards extending longitudinally of the track rails, and a carriage mounted to travel longitudinally between and below the track rails.

12. A rack of the kind described comprising a pair of elevated track rails, a pair of inclined track rails leading to the elevated track rails, and separable hinge members for connecting the inclined track rails to either of the ends of the elevated track rails, and a carriage having a body-supporting member mounted to travel longitudinally and transversely between and below the elevated track rails.

13. A rack of the kind described comprising a pair of elevated track rails, a pair of inclined track rails leading to the elevated track rails, separable hinge members for connecting the inclined track rails to either of the ends of the elevated track rails, and removable stops adapted to be secured in respect to the elevated track rails at either of their ends.

14. The structure defined in claim 13 in further combination with guard rails extended longitudinally of the inclined track rails.

15. The structure defined in claim 13 in further combination with guard rails extended longitudinally of the elevated track rails and the inclined track rails.

16. A rack of the kind described comprising a pair of laterally spaced supports, and a carriage mounted to travel longitudinally between and below the same, said carriage having a creeper-like body mounted to travel longitudinally thereon, said body having an adjustable back.

17. The structure defined in claim 16 in further combination with an adjustable head rest for the adjustable back.

18. A rack of the kind described comprising a pair of laterally spaced supports, and a carriage mounted to travel longitudinally between and below the same, said carriage having a creeper-like body mounted to travel longitudinally thereon, said body having a folding back.

19. A rack of the kind described comprising a pair of laterally spaced supports, a jack support extending transversely of said supports, a jack mounted on said jack support, and a carriage mounted to travel longitudinally between and below said supports.

20. The structure defined in claim 19 in which the jack support is adjustable longitudinally of the supports.

21. The structure defined in claim 19 in which the jack is adjustable on the jack support transversely of the supports.

22. The structure defined in claim 19 in which the jack is locked to the jack support except for movement transversely of the supports.

23. The structure defined in claim 19 in which the jack support is shiftable from one support to the other.

24. A rack of the kind described comprising a pair of laterally spaced elevated supports, a pair of inclined track rails leading to the elevated supports, and a carriage arranged to travel between the supports and track rails.

25. A rack of the kind described comprising a pair of laterally spaced elevated supports, a pair of inclined track rails leading to the elevated supports, a carriage arranged to travel between the supports and track rails, and stops on the elevated track rails.

26. A rack of the kind described comprising a pair of laterally spaced elevated supports, a pair of inclined track rails leading to the elevated supports, separable hinge members connecting the inclined track rails to the elevated supports, and a carriage arranged to travel between the supports and inclined track rails.

27. A rack of the kind described comprising upper and lower pairs of track rails, a carriage mounted to travel on the lower track rails, and inclined track rails leading to the upper pair of track rails, said lower track rails being extended under the inclined track rails.

28. A rack of the kind described comprising upper and lower pairs of track rails, a carriage mounted to travel on the lower track rails, inclined track rails leading to the upper pair of track rails, said lower track rails being extended under the inclined track rails, and separable hinge members connecting the inclined track rails to the upper track rails.

29. A vehicle work rack comprising a frame-work provided with upper and lower pairs of rails, the upper rails affording a vehicle runway, and a work carriage mounted to travel on said lower rails to movably support a workman below a vehicle positioned on said upper rails.

30. A vehicle work rack comprising a frame-work provided with upper and lower pairs of rails, said upper rails affording a vehicle runway, and said lower rails having channel-forming flanges turned inward, and a work carriage having wheels arranged to run in the channels and on the flanges of said lower rails to movably support a workman below a vehicle positioned on said upper rails.

In testimony whereof I affix my signature.

ANDREW C. LARSEN.